United States Patent [19]

Fujihara et al.

[11] Patent Number: 4,729,597
[45] Date of Patent: Mar. 8, 1988

[54] VEHICLE ROOF STRUCTURE HAVING LONGITUDINAL BEAM AND LEFT AND RIGHT REMOVABLE ROOF LIDS

[75] Inventors: Ryoji Fujihara, Tokyo; Kazuaki Furuse, Atsugi; Satoshi Ishizuka; Koichi Yagami, both of Zama; Tsutomu Iwasaki, Yokohama, all of Japan

[73] Assignee: Nissan Motor Co., Ltd., Yokohama, Japan

[21] Appl. No.: 35,325

[22] Filed: Apr. 7, 1987

[30] Foreign Application Priority Data

Apr. 9, 1986 [JP] Japan ................... 61-81662

[51] Int. Cl.⁴ ............................. B60J 7/11; B60J 7/19
[52] U.S. Cl. .................................. 296/218; 296/224; 16/272; 16/355
[58] Field of Search ................ 296/218, 220, 224; 16/271, 272, 355

[56] References Cited

U.S. PATENT DOCUMENTS 1,963,273  6/1934  Kellogg .................................. 16/355
4,475,766 10/1984  McKee ................................. 296/213

FOREIGN PATENT DOCUMENTS 59-186735 10/1984 Japan .

Primary Examiner—Dennis H. Pedder
Attorney, Agent, or Firm—Schwartz, Jeffery, Schwaab, Mack, Blumenthal & Evans

[57] ABSTRACT

A roof structure of a vehicle is composed of left and right removable roof lids, and a frame having front and rear portions, a longitudinal center beam connecting the front and rear portions, and left and right roof openings which are separated by the center beam between the front and rear portions, and closed by the left and right roof lids. Front and rear receiving members each having left and right latch holes are fixedly mounted on the center beam. Front and rear L-shaped latch plates are fixed to the underside of an inboard portion of each lid so that the front and rear latch plates are inserted in the latch holes of the front and rear receiving members, interlocking with each other, for securing the lid to the frame. Each of the receiving members further has a top wall which is formed with a stopper projection projecting upwardly. Each lid further has front and rear slider members of resin which abut against the stopper projections of the front and rear receiving members in installing and removing the lid to facilitate installation and removal.

9 Claims, 8 Drawing Figures

VEHICLE ROOF STRUCTURE HAVING LONGITUDINAL BEAM AND LEFT AND RIGHT REMOVABLE ROOF LIDS

CROSS REFERENCE TO RELATED APPLICATION

A U.S. application (Ser. No. 07/035,420) based on prior Japanese applications Nos. 61-80481 and 61-93261, relates to subject matter similar to that of the present application.

BACKGROUND OF THE INVENTION

The present invention relates to a vehicle roof structure having a longitudinal center beam and left and right removable roof lids.

One conventional example is shown in FIGS. 6-8. (A similar roof structure is disclosed in Japanese provisional publication No. 59-186735.) A roof frame structure 1 of this example has a longitudinal center beam 2 separating left and right roof openings 3. Front and rear receiving members 4 each having left and right latch holes 5 are fixed to an upper surface of the center beam 2 by screws 6. Front and rear latch plates 8 are fixed to an underside of each of left and right roof lids 7 by screws 9. In a closed state, the front and rear latch plates 8 of each lid are inserted in the latch holes 5 of the front and rear receiving members 4, and the inner ends of both lids substantially abut on each other above the center beam 2 so that the center beam 2 is concealed under the closed roof surface. Each of the lids 7 further has front and rear lock rods 10 which are projected into lock holes 11 of the frame structure, and retracted by operating a handle (not shown). There are further provided weatherstrips 12 for abutting against the undersides of the lids 7.

In this roof structure, each lid 7 is installed and removed by inserting and extracting the latch plates 8 into and from the receiving members 4 while lifting up the outer end of the lid. In this case, each lid 7 tends to slip inwardly into an improper position shown by a two-dot chain line in FIG. 8. In this improper position, the latch plate 8 is inserted into the receiving member 4 improperly so that it becomes difficult to extract the latch plate 8, and the inner end of the lid 7 is easily blemished.

SUMMARY OF THE INVENTION

It is an object of the present invention to provide a vehicle roof structure in which each of left and right removable roof lids can be easily installed and removed, and the edges of the lids can be protected.

According to the present invention, a roof structure of a vehicle comprises a frame structure, left and right removable roof lids, and fastening means.

The frame structure has a front portion, a rear portion, a center beam extending along a longitudinal axis of the vehicle and connecting the front and rear portions, and left and right roof openings formed between the front and rear portions and separated by the center beam.

The left and right roof lids can close the left and right roof openings, respectively, to form a closed roof surface and conceal the center beam under the closed roof surface when the left and right lids are placed in respective left and right closed positions.

The fastening means is for securing the left and right roof lids in the left and right closed positions to the frame structure. The fastening means comprises left and right latch means fixed, respectively, to undersides of the left and right lids, and receiving means which is fixedly mounted on an upper surface of the center beam, and formed with left and right latch holes receiving the left and right latch means, respectively, when the lids are placed in the closed positions.

According to the present invention, the receiving means has a top wall formed with a stopper projection projecting upwardly and extending along the longitudinal axis of the vehicle, and the fastening means further comprises left and right slider means fixed, respectively, to inner ends of the left and right lids for limiting insertion of said latch means into said receiving means by abutting on the stopper projection.

Preferably, the slider means of each lid has an upper end covering and protecting an inner edge of the lid, and an arched bottom which rests on the top wall of the receiving means when the lid is placed in its closed position.

DETAILED DESCRIPTION OF THE INVENTION

Figure 1:
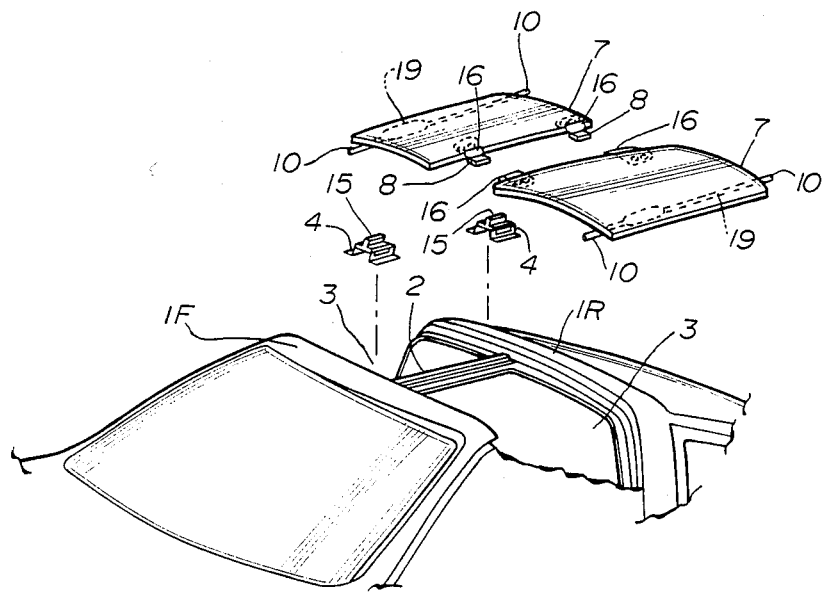
FIG. 1 is a perspective view of a vehicle roof structure showing a first embodiment of the present invention.
Figure 2:
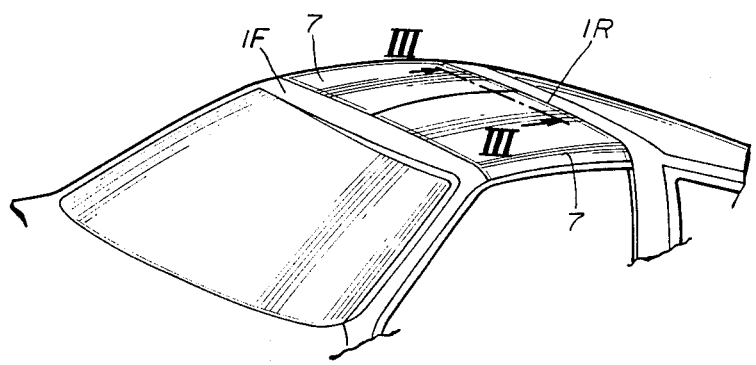
FIG. 2 is a perspective view of the roof structure of FIG. 1 for showing a closed state.
Figure 3:
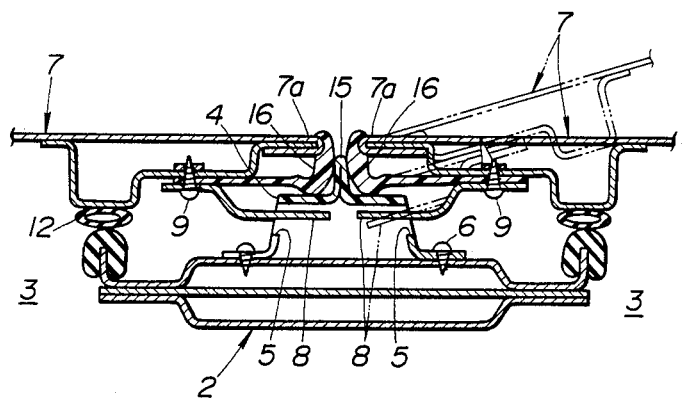
FIG. 3 is a sectional view taken on a line III—III of FIG. 2.

A first embodiment of the present invention is shown in FIGS. 1-3. A vehicle roof structure shown in FIG. 1 has a front portion 1F, a rear portion 1R and a center beam 2 extending along a longitudinal axis of the vehicle. A front end of the center beam 2 is fixed to the front portion 1F, and a rear end of the center beam 2 is fixed to the rear portion 1R. An interspace between the front and rear portions 1F and 1R is bisected by the center beam 2 into left and right roof openings 3. The roof structure further includes left and right removable roof lids 7, which close the left and right roof openings 3, respectively, when the left and right lids 7 are placed in respective closed positions, as shown in FIG. 2. In the state shown in FIG. 2, the inner ends of the left and right lids 7 abut, literally or substantially, on each other along and above the center beam 2, and the center beam 2 is concealed under the roof surface formed by the lids 7.

Front and rear receiving members 4 are fixed to an upper surface of the center beam 2. Each of the receiving members 4 has a left side wall formed with a left latch hole 5 and a right side wall formed with a right latch hole 5. Front and rear latch plates 8 are fixed to an underside of each lid 7 near the inner end of the lid 7. In the closed state shown in FIG. 2, the front and rear latch plates 8 of each lid 7 are inserted in the left or right latch holes 5 of the front and rear receiving members 4, respectively.

Each of the front and rear receiving members 4 further has a substantially flat top wall formed with a stopper projection 15. The stopper projection 15 of each receiving member 4 projects upwardly from the substantially flat top wall at right angles, and extends along a center line of the receiving member 4 so as to bisect the upper surface of the top wall into left and right halves.

Each of the left and right lids 7 further has front and rear slider members 16 made of resin. In each lid 7, the front and rear slider members 16 are fixed to the lid 7 at such positions near the inner end of the lid 7 that the front and rear slider members 16 are situated just above the front and rear latch plates 8, respectively. Each of the slider members 16 has a mounting portion fixed to one lid 7, and a projecting portion projecting from the mounting portion. Each of the latch plates 8 has a raised portion fixed to one lid 7, and a depressed portion which projects from the raised portion, and which is inserted in one latch hole 5 of one receiving member 4 in the closed state shown in FIG. 2. In each lid 7, the mounting portion of the front slider member 16 and the raised portion of the front latch plate 8 are overlapped each other, and fixed together to the underside of the lid 7 by common screws 9. The rear slider member 16 and the rear latch plate 8 of each lid 7 are fixed to the underside of the lid 7 in the same manner. The mounting portion of each slider member 16 is clamped between one latch plate 8 and the underside of one lid 7. As shown in FIG. 3, the projecting portion of each slider member 16 abuts on a left or right side surface of the stopper projection 15 of the front or rear receiving member 4 when the lids are placed in the closed positions. In this state, the stopper projection 15 of each of the front and rear receiving members 4 is sandwiched between the front or rear slider members 16 of the left and right lids 7, as shown in FIG. 3.

The projecting portion of each slider member 16 has an upper end, an abutting end and an arched bottom. In the closed state, the arched bottom of each slider member 16 is placed on the left or right half of the upper surface of the top wall of the front or rear receiving members 4, so that the lid 7 can be easily rotated from its closed position to an inclined position shown by two dot chain lines in FIG. 3 by lifting up the outer end of the lid 7. The abutting end of each slider member 16 abuts on the left or right side surface of one of the stopper projections 15 in the closed state. The abutting end of each slider member 16 is also arched, and forms a smooth, continuous curved surface with the arched bottom, as shown in FIG. 3. Therefore, the projecting portion of each slider member 16 can rotate smoothly by sliding on the upper surface of the receiving member 4 and the side surface of the stopper projection 15. The upper end of each slider member 16 is engaged with a hemmed inner edge 7a of one of the lids 7 in such a manner as to cover and protect the hemmed inner edge 7a.

In this roof structure, each lid 7 is removed by lifting the outer end of the lid 7, and extracting the latch plates 8 from the latch holes 5 of the receiving members 4. In this case, each of the front and rear slider members 16 is rotated smoothly with the arched botom sliding on the upper surface of the top wall of one receiving member 4, and with the abutting end sliding on the left or right side surface of one stopper projection 15. Therefore, the stoper projections 15 and the slider members 16 prevent each lid 7 from slipping inwardly, and prevent the latch plates 8 from being inserted too deeply. Each lid 7 is rotated from the closed position to the inclined position about a pivot axis which is held stationary in or near the arched bottom of each slider member 16 by the cooperation of the stopper projections 15 and the slider members. Therefore, the latch plates 8 are rotated always along predetermined paths without plunging excessively into the receiving members 4.

The stopper projections 15 and the slider members 16 facilitate the installation of each lid 7 in the same manner. Each lid 7 can be easily installed by inserting the lid 7 until the slider members 16 abut against the stopper projections 15, and then lowering the outer end of the lid 7. In this case, the lid 7 is rotated about the pivot axis which is held stationary in or near the arched bottoms of the slider members 16, and the latch plates 8 are smoothly inserted into the latch holes 5 of the receiving members 4. The hemmed inner edge of each lid 7 is covered by the upper ends of the slider members 16, so that the hemmed inner edge is prevented from directly bumping against the stopper projections 15.

The top wall and the stopper projection 15 may be made of a metal, or a resin, such as a synthetic resin, or may be made of a metal covered with a resin.

Figure 4:
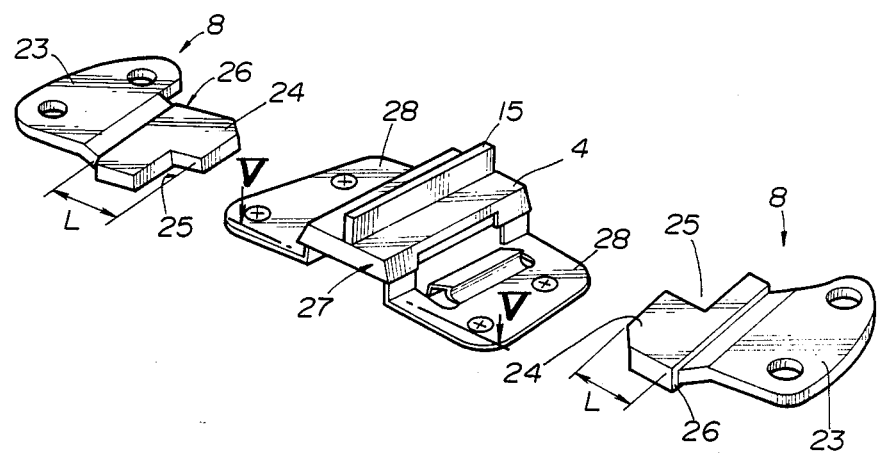
FIG. 4 is a perspective view of a set of a receiving member and left and right latch plates for showing a second embodiment of the present invention.
Figure 5:
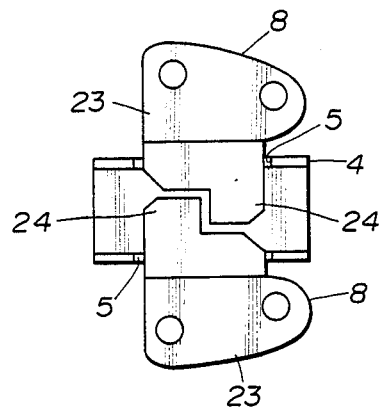
FIG. 5 is a sectional view taken on a line V—V of FIG. 4, for showing the closed state.
Figure 6:
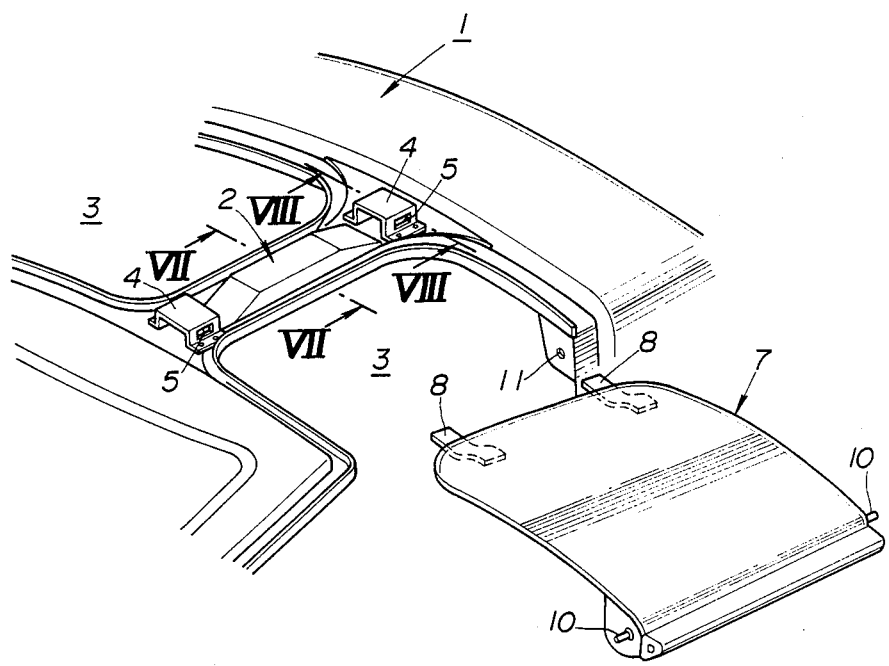
FIG. 6 is a perspective view of a conventional roof structure.
Figure 7:
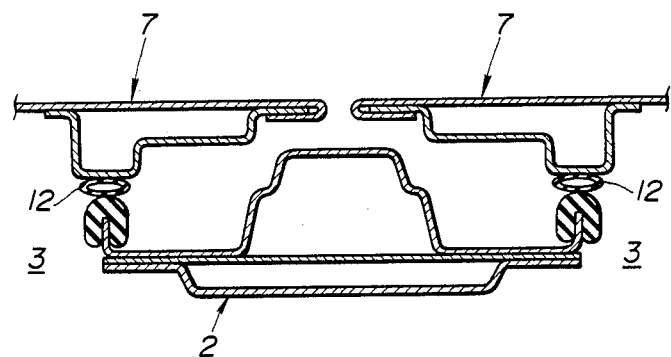
FIG. 7 is a sectional view taken on a line VII—VII of FIG. 6.
Figure 8:
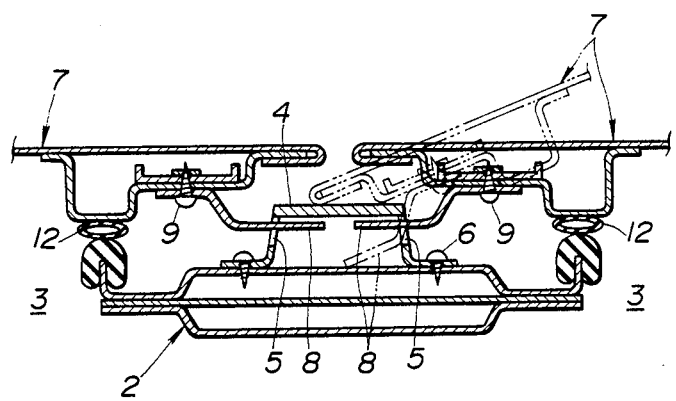
FIG. 8 is a sectional view taken on a line VIII—VIII.

A second embodiment of the present invention is shown in FIGS. 4 and 5. A roof structure of the second embodiment has a frame structure substantially identical to that of the first embodiment shown in FIG. 1. That is, the frame structure of the second embodiment has a front portion 1F, a rear portion 1R, a longitudinal center beam 2, and left and right roof openings 3 like the first embodiment.

Front and rear receiving members 4 each having left and right latch holes 5 and a stopper projection 15 are fixed to the upper surface of the center beam 2, and front and rear latch plates 8 and slider members 16 are fixed to each of left and right roof lids 7 in the same manner as in the first embodiment.

Each of the latch plates 8 of the second embodiment has a raised portion 23 fixed to the underside of one of the left and right lids 7, and a depressed portion projecting from the raised portion like the latch plates of the first embodiment. The depressed portion of each latch plate 8 of the second embodiment, however, is L-shaped, as shown in FIG. 4, and has a projecting end 24 and a rectangular hollow corner 25 formed by the angle of the L-shaped figure of the depressed portion. In each pair of the front or rear latch plates 8 of the left and right lids 7 to be inserted in the same receiving member 4, the L-shaped figure of one latch plate 8 is reverse to that of the other latch plate 8, as shown in FIG. 4, so that the hollow corner 25 lies behind the projecting end 24 in one latch plate 8 while the hollow corner 25 lies in front of the projecting end 24 in the opposite latch plate 8. In each receiving member 4, as shown in FIG. 5, the projecting end 24 of one latch plate 8 is deeply inserted in one latch hole 5 of the receiving member 4, and snugly received in the rectangular hollow corner 25 of the opposite latch plate 8 when both lids 7 are placed in the closed state. The projecting end 24 of each latch plate 8 projects from the raised portion 23 through such a sufficient distance that the projecting end 24 is inserted deeply in one of the receiving members 4 to or beyond a center line of the receiving member 4. With the long and deeply inserted latch plates 8, each lid 7 can be secured in its closed position very reliably. In the second embodiment, the stopper projections 15 and the slider members 16 can facilitate installation and removal of each lid 7, and protect the inner edge of each lid 7 in the same manner as in the first embodiment. In the second embodiment, the depressed portion of each latch plate 8 is covered with a resin molding 26, and the top wall and stopper projection 15 of each receiving member 4 is made of metal, and covered with a resin molding 27.

What is claimed is:

1. A roof structure of a vehicle comprising;

a frame structure having a front portion, a rear portion, a center beam extending along a longitudinal axis of the vehicle and connecting said front and rear portions, and left and right roof openings formed between said front and rear portions and separated by said center beam, left and right removable roof lids for closing said left and right roof openings, respectively, to form a closed roof surface and concealing said center beam under the closed roof surface when said left and right lids are placed in respective left and right closed positions, and fastening means for securing said left and right lids in said left and right closed positions to said frame structure, said fastening means comprising left and right latch means fixed, respectively, to undersides of said left and right lids, and receiving means which is fixedly mounted on an upper surface of said center beam, and formed with left and right latch holes receiving said left and right latch means, respectively, when said lids are placed in said closed positions, said receiving means having a top wall formed with a stopper projection projecting upwardly and extending along the longitudinal axis of the vehicle, said fastening means further comprising left and right slider means fixed, respectively, to inner ends of said left and right lids for limiting insertion of said latch means into said receiving means by abutting on said stopper projection.

2. A roof structure according to claim 1 wherein, in each lid, said slider means is fixed to said underside of said lid at such a position that said slider means is interposed between said underside of said lid and said latch means.

3. A roof structure according to claim 2 wherein said slider means of each lid has an upper end covering and protecting an inner edge of said lid, and an arched bottom which rests on said top wall of said receiving means when said lid is placed in its closed position.

4. A roof structure according to claim 3 wherein an upper surface of said top wall of said receiving means is substantially flat, and bisected into left and right halves by said stopper projection.

5. A roof structure according to claim 4 wherein said receiving means comprises front and rear receiving members each having said left and right latch holes, and said top wall formed with said stoper projection, said front and rear receiving members being fixed on said center beam apart from each other along said center beam, and wherein said latch means of each lid comprises front and rear latch plates fixed to said lid so that said front and rear latch plates can be inserted, respectively, into said front and rear receiving members.

6. A roof structure according to claim 5 wherein said slider means of each lid comprises front and rear slider members each having said upper end and said arched bottom, front and rear slider members of each lid being fixed to said underside of said lid so that said front and rear slider members can abut on said stopper projections of said front and rear receiving members, respectively.

7. A roof structure according to claim 6 wherein each of said slider members has an arched abutting end which abuts against one of said stopper projections when said lids are placed in said closed positions.

8. A roof structure according to claim 7 wherein an end of each of said slider members, and an end of one of said latch plates are overlapped to each other and fixed together to said underside of one of said lids.

9. A roof structure according to claim 5 wherein each of said latch plates has a raised portion fixed to one of said lids, and a depressed portion to be inserted in one of said latch holes, said depressed portion of each latch plate being L-shaped, and formed with a projecting end and a hollow corner formed by an angle of the shape of said depressed portion in such a manner that, in each of said receiving members, said projecting end of said latch plate of one of said lids is received in said hollow corner of said latch plate of the other of said lids when said lids are placed in said closed positions.

* * * * *